Feb. 11, 1958 A. C. WEBER 2,823,346
CONTROL APPARATUS RESPONSIVE TO RAINFALL
Filed July 14, 1954 2 Sheets-Sheet 1
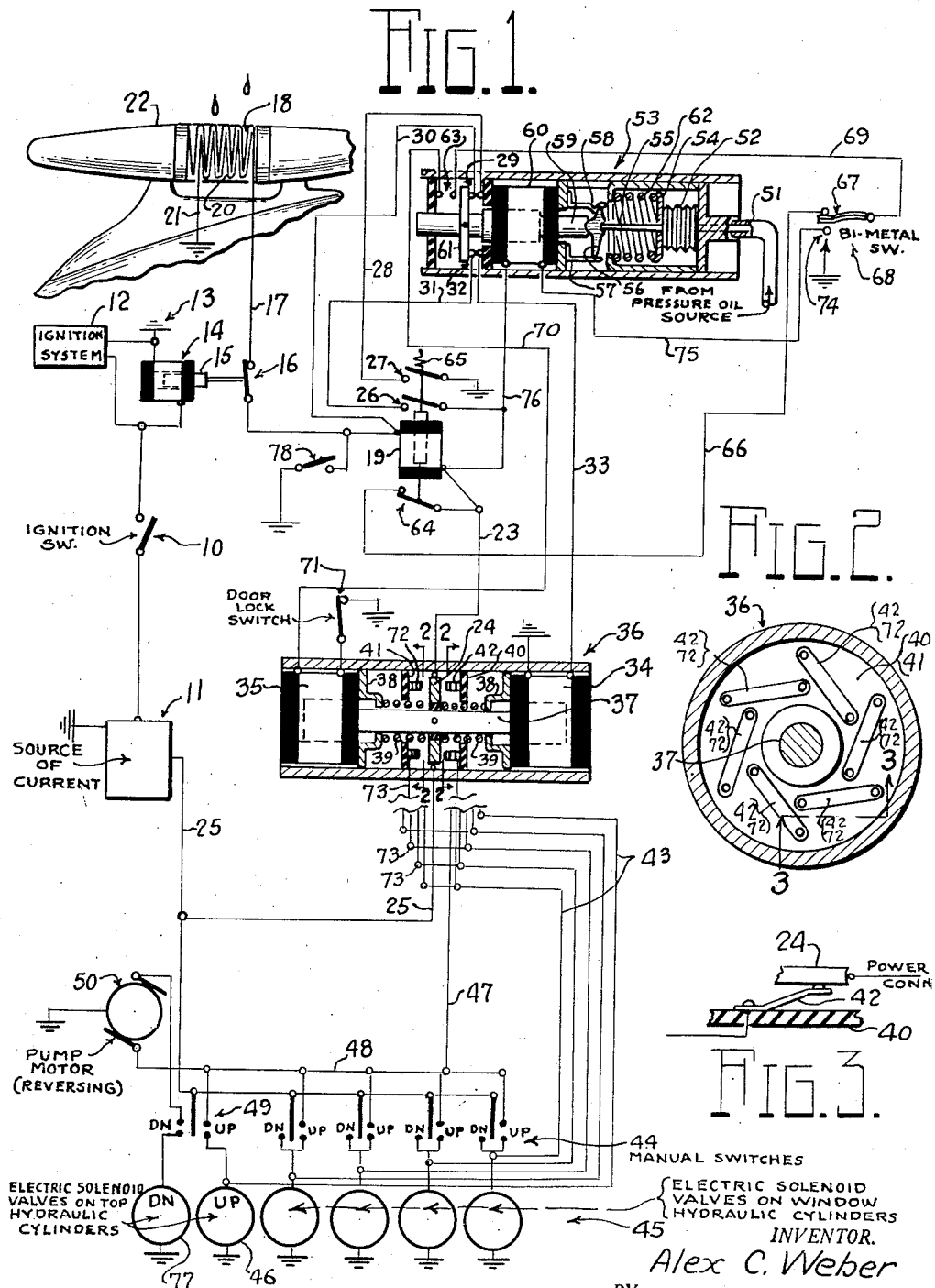
INVENTOR.
Alex C. Weber
BY
Owen K. Owen
ATTORNEYS

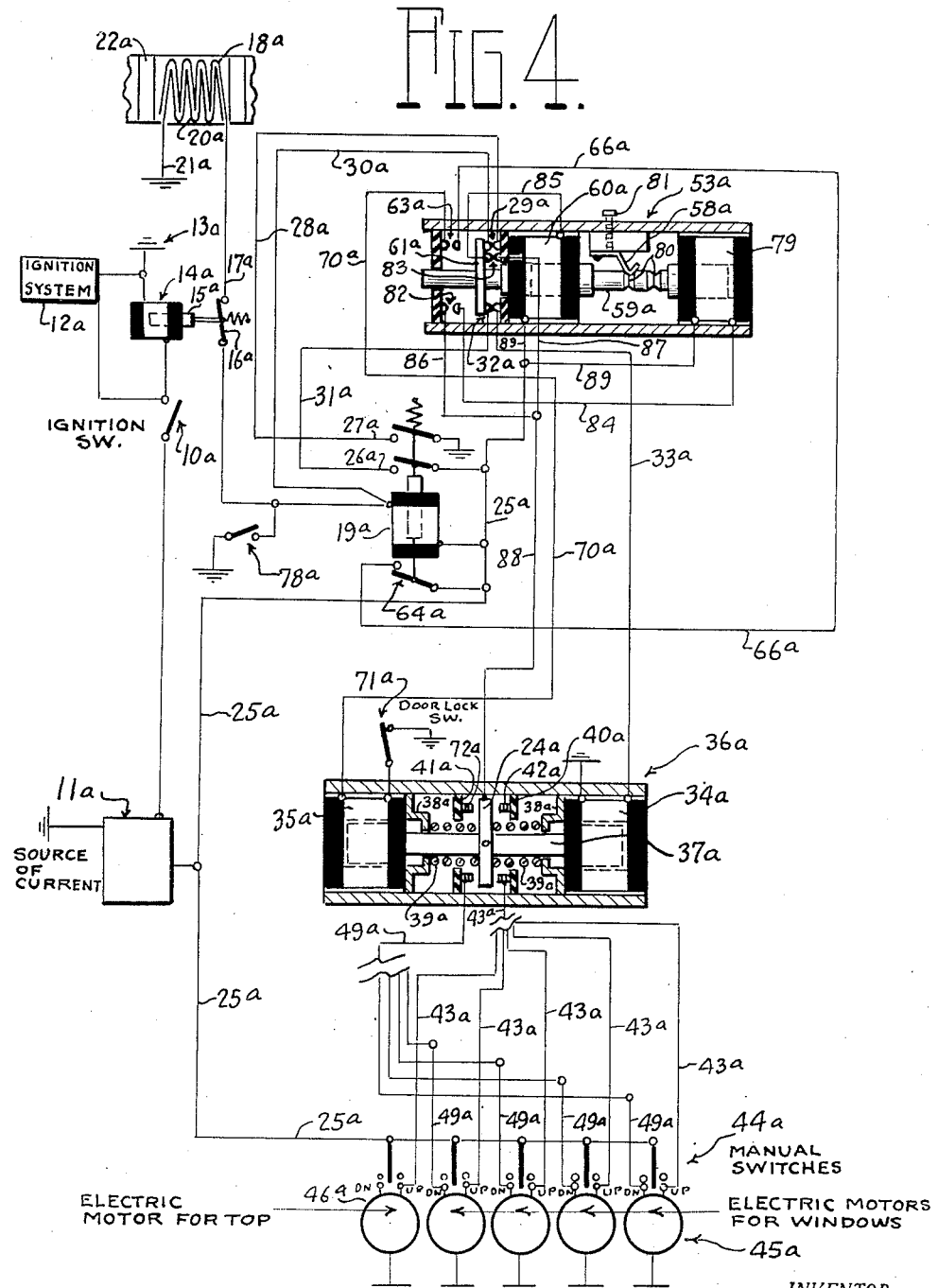

United States Patent Office 2,823,346
Patented Feb. 11, 1958

2,823,346

CONTROL APPARATUS RESPONSIVE TO RAINFALL

Alex C. Weber, Fort Lauderdale, Fla., assignor of one-half to Carl R. Brown, Boynton Beach, Fla.

Application July 14, 1954, Serial No. 443,208

4 Claims. (Cl. 318—483)

This invention relates to control apparatus which is responsive to rainfall or to similar conditions of the presence of moisture as, for example, a leak or a flow of water, which apparatus is intended to activate mechanisms for closing windows or doors, for sounding alarms, for raising a top on a convertible automobile, for actuating a dehumidifier or for similar operations.

The modification of the invention which is to be described in the following specification and in the appended drawings, is an apparatus particularly intended for the purpose of raising the windows of a closed automobile or the windows and the top of a convertible automobile in the event of a rain when the automobile has been parked with its top and windows down.

Several such automatic window and top raising devices have been developed in the past but certain difficulties have been encountered in their operation resulting from their design and from peculiarities of drivers' habits and desires. Mechanical window and top raising mechanisms usually are operated either by electric motors or by hydraulic cylinders and pistons either of which furnishes the necessary power for actuating the leverages by which the windows and/or top are raised.

In the case of an electrical system the motors which drive the linkages are reversible so that the window and/or top are driven both when moving up and when moving down. In the case of a hydraulic system the apparatus is usually designed so that the hydraulic cylinders are employed to raise the windows and the windows usually are lowered by force stored in springs which are compressed during the raising operation. In a hydraulic top raising and lowering system the top is driven in both directions. Most power operated window and top raising systems are provided with individual push buttons by means of which the driver may individually energize the mechanisms for raising each of the windows and/or the top. In these old systems the driver holds the switch closed until the window or the top has reached the desired position.

When such systems are made automatic, for example, rain responsive, the systems of the prior art have included limit switches which are closed or opened, as the case might be, when the windows or the top reach the limits of their movement. In such systems it is necessary to install these limit switches in the doors of the automobile, for example, and at some location where parts of the top mechanism would engage the limit switches. While this is not too difficult if the mechanism is installed during manufacture of the automobile, installation of the mechanism as an accessory is rendered extremely difficult by the requirement that the doors and upholstery be opened up in order to permit the switches to be installed. Because only one of the window mechanisms usually is provided with such a limit switch, even when installed as original equipment, jams or misalignments of that single mechanism resulting from normal driving vibration will render the entire control inoperative.

Most devices of this type which have been developed are so designed that they operate to close the automobile when rainfall starts but they leave the windows closed after the rain has stopped and, consequently, particularly in warm climates, the interior of the automobile becomes excessively hot during the period after rainfall has ceased.

The principal object of the instant invention, as embodied in an apparatus for actuating automobile power window and/or top closing mechanisms, is to provide for the control of the windows and top to close them upon the beginning of a rainfall and to reopen the windows after the rainfall has ceased and when the sun becomes warm enough so that the interior of the automobile would be uncomfortable if it were left closed.

A further object of the invention is to provide a control apparatus for opening and closing power operated windows of automobiles or doors and windows of enclosed spaces or to sound alarms, when moisture conditions are present, which apparatus can be installed in presently existing equipment without the necessity for completely rebuilding the equipment with which it is to operate. This objective is particularly advantageous in the case of apparatus for the control of windows and/or tops of automobiles.

These objects and other will be better understood from the specification which follows and from the drawings, in which:

Fig. 1 is a schematic wiring diagram of a control apparatus embodying the invention as designed for the operation of hydraulically powered window and top actuating mechanisms of an automobile.

Fig. 2 is an enlarged fragmentary vertical sectional view taken substantially on either of the lines 2—2 of Fig. 1.

Fig. 3 is a still further enlarged fragmentary sectional view taken from the position indicated by the line 3—3 of Fig. 2.

Fig. 4 is a schematic wiring diagram similar to Fig. 1 but illustrating control apparatus embodying the invention as designed to operate electrically powered window and top actuating mechanisms of an automobile.

Control apparatus embodying the invention comprises a number of parts connected as shown in Fig. 1 to the electrical ignition system of the automobile on which it is installed. An automobile has an ignition switch indicated at 10 in Fig. 1, which is closed when the automobile is to be operated and which is opened when the ignition is locked and the automobile is to be left stationary. The ignition switch 10 is in series with a source of current 11, i. e., the battery or magneto, the ignition system 12 comprising the distributor, spark plugs, etc., and the frame of the automobile indicated by the ground symbol 13. In apparatus according to the invention a solenoid coil 14 is placed in series between the ignition switch 10 and the ground 13.

The coil 14 has an armature 15 connected to the contact of a normally closed switch 16. When the ignition switch 10 is closed, i. e., the automobile is to be operated and thus a driver is present, the coil 14 is energized, opening the switch 16. When, however, the ignition is locked, indicating that the driver has departed from the automobile, the coil 14 is de-energized and the switch 16 is in its normally closed position.

The switch 16 is interposed in a lead 17 connecting a free ended conductor 18 to the ground side of a relay coil 19. The conductor 18 is one of a pair of closely associated conductors, the other conductor 20 being connected by a lead 21 to ground. The two conductors 18 and 20 as illustrated in Fig. 1, serve as a moisture responsive circuit closer and constitute the subject matter of my copending application Serial No. 435,766, now abandoned. Their precise configuration therefore will not be specifically disclosed herein except for the fact that they are so spaced one from the other that drops of rain falling upon a body 22 on which they are located on the exterior of the automobile, bridge the space between the conductors 18 and 20 and thus establish a circuit from ground through the lead 21, conductor 20, conductor 18, lead 17, relay coil 19, a lead 23, a ring contact 24 and a lead 25 to the source of current 11.

Establishment of the circuit just described energizes the coil 19, closing normally open relay contacts 26 and 27. The closing of relay contact 27 establishes a holding circuit from ground through the contact 27, a lead 28, a pair of contacts 29, a lead 30 and the coil 19 of the relay to the lead 23 and the source of current 11. Thus, as long as the relay 19 is energized and the contacts 29 are closed, a circuit is maintained for holding the coil 19 energized.

Closing the contacts 26 establishes a circuit from the lead 23 through the contacts 26, a lead 31, a pair of contacts 32 and a lead 33 to a coil 34 and then to ground. The coil 34 is one of a pair of coils 34 and 35 which constitute the actuating coils of a self-centering, double-throw switch generally indicated at 36. The switch 36 includes the coils 34 and 35 and a double armature 37 which extends through both the coils 34 and 35 and on which the contact ring 24 is rigidly mounted. The armature 37 extends through a pair of spaced opposed collars 38 with a coil spring 39 located between each of the collars 38 and the opposite sides of the ring contact 24. The ring contact 24 is located between a pair of annular contact plates 40 and 41. The contact plate 40 (see also Figs. 2 and 3) has a plurality of spring contact members 42 arranged around its periphery and so designed as to be closed by the ring contact 24 whenever it is moved to that side of the switch 36 by the energization of the coil 34. Each of the contacts 42 is individually connected by one of a group of parallel leads 43 to one of a series of electric solenoid actuated valves 45 for the window hydraulic cylinders (not shown). Similarly an electric solenoid actuated valve 46 which controls the admission of hydraulic fluid to the top actuating hydraulic cylinder (not shown) for raising the top, is connected by one of the leads 43 to its contact 42.

Another one of the contacts 42 is connected by a lead 47 to a conventional line 48 that is common to one of a pair of "up" contacts on each of a plurality of individual manually operated window control switches 44. In the case of a convertible automobile having a power operated top actuating mechanism, the line 48 is also connected to one of a pair of similar "up" contacts of a manually operated top control switch 49. The line 48 also leads to one side of a hydraulic pump motor 50 which is illustrated as being reversible. In other arrangements, the reversible pump motor 50 may be replaced by a uni-directional motor and fluid flow control valve for reversing the direction of fluid flow. Each of the others of the pairs of "up" contacts of the switches 44 and 49 is connected to its associated one of the leads 43.

By establishing a circuit through the coil 34 of the switch 36, the armature 37 is pulled to the right (Fig. 1) pressing the ring contact 24 against the individual contacts 42 and closing a series of parallel circuits from the source of current 11 through the lead 25, the ring contact 24, the contacts 42, the leads 43 to the electrical solenoid valves 45 and 46 for the window and top hydraulic actuating cylinders. At the same time the contact 42 for the lead 47 is closed to energize the pump motor 50 to pump hydraulic fluid into the actuating cylinders. The cylinders act through the several mechanisms and linkages to move the windows upwardly and to swing the top up into its closed position.

The hydraulic system to which the pump driven by the motor 50 is connected has a line 51 which is in communication with the interior of a bellows 52 mounted in a surge-responsive, reversing switch generally indicated at 53.

The bellows 52 has a cap 54 and a plunger rod 55. The plunger rod 55 extends against one side of a dog 56 which is rockingly mounted on an arm 57 and the upper arm of which is engaged with a detent 58. The other side of the dog 56 is in contact with an end of an armature plunger 59 extending through a coil 60, the opposite end of the plunger 59 mounting a pressure disk 61. A coil spring 62 surrounds the plunger rod 55 acting to resist the expansion of the bellows 52.

When the hydraulic actuating cylinders reach the end of their strokes, i. e., when the last one of the windows is up and/or the top is moved to its closed position, resistance to further movement of the hydraulic cylinders creates a pressure surge in the hydraulic system. The coil spring 62 resisting movement of the bellows 52 is so balanced that pressure in the hydraulic line 51 during the movement of any of the actuating pistons is insufficient to overcome the resistance of the spring 62 and detent 58 to produce counterclockwise movement of the dog 56. However, when the power surge occurs, the spring 62 and detent 58 are overcome and the dog 56 is moved beyond the detent 58, sliding the armature 59 to the left (Fig. 1) and moving the pressure disk 61 to the left, which allows the contacts 29 and 32 to open and closes a pair of contacts 63.

Because all of the actuating cylinders for the windows and the top (if included) are parts of a common single hydraulic system, a "hang up" or jam of any one or more of the individual window or top cylinders does not raise the pressure appreciably in the system and, therefore, the remaining cylinders continue to be moved to close the other windows or top. When no more movement of windows or top is possible, i. e., when they are all closed or closed and "hung up," this occurring when the last-to-close element closes, the hydraulic pressure surge takes place and shifts the armature 59 as described without regard to which of the mechanisms, if any, are mechanically jammed or "hung up."

The operation just explained is contrasted to other controls for power actuated closing mechanisms where a jam or "hang up" of the mechanism which operates the limit switch, or switches, would leave the mechanisms operating, or rather, trying to operate, until they were shut off by an operator or burned out.

Opening the contacts 32 breaks the circuit to the coil 34 which releases its armature 37 and allows the coil spring 39 to return the ring contact 24 to its central neutral position. This de-energizes the electric solenoid valves 45 and 46 and they return to closed position. Opening the contacts 29 breaks the holding circuit for the relay coil 19. The windows are up and the top is closed. However, as long as rain continues to fall or until such time as the sun has been out long enough to dry the body 22 and evaporate the moisture bridging between the conductors 18 and 20, the circuit from ground through those conductors to the relay coil 19 remains closed and, consequently, the two contacts 27 and 26 remain closed and an oppositely actuated contact 64 remains open.

After the sun has been out long enough for the rain to be evaporated and thus the interior of the automobile would become uncomfortably hot for the returning driver, the moisture bridging the conductors 18 and 20 evaporates and the coil 19 is de-energized. The relay controlled by the coil 19 returns to the position shown in Fig. 1 by the action of a return spring 65 and the contact 64 is closed. Because the armature 59 is at the left (in response to the surge of hydraulic fluid occurring when the windows and top close) and is retained in that position by the detent 58, the contacts 63 are closed and a circuit is established from the line 23 through the contacts 64, a lead 66, a normally closed contact 67 of a snap-action bimetallic switch 68, a lead 69, the contacts 63 and a lead 70 to the coil 35 and through a normally closed door lock switch generally indicated at 71 to ground, the purpose and operation of which will be explained below.

Energization of the coil 35 pulls the armature 37 to the left, pulling the ring contact 24 against a series of contacts 72 which are substantially identical to the contacts 42. Closing the contacts 72 establishes circuits from the lead 25 through the contacts 72 and a plurality of parallel leads 73 which are connected to the respective ones of the leads 43 to the window solenoid valves 45 to actuate them into their open valve positions. The hydraulic cylinders are thus opened to allow previously loaded return springs in the leverages and linkages which actuate the windows to operate to force fluid from the cylinders and to return the windows to their open positions.

While the springs act to open the windows, current continues to flow through the circuit including the contacts 67 of the bimetallic switch 68. As current flows through the bimetallic switch 68 it heats and eventually reaches a temperature such that the bimetal snaps open. This opens the contacts 67 and closes a contact 74 directly to ground and to a lead 75 to the coil 60 and through the coil 60 and a lead 76 to the lead 23 and thus to the source of current 11. Energization of the coil 60 pulls the armature 59 to the right breaking the contacts 63 and restoring the armature 59 and the dog 56 to the position shown in Fig. 1. As soon as the bimetallic switch 68 snaps to open the contacts 67 the circuit through the contacts 63 and to the coil 35 is broken and the coil 35 immediately is de-energized which allows the spring 39 to return the ring contact 24 to the center, de-energizing the electric solenoid valves 45 so that they close.

Even if the length of time required to snap the bimetallic switch 68 in response to heat generated by the current flowing therethrough is not sufficient to permit the windows to be completely opened, it is not important because the windows need not be completely opened in order to ventilate the interior of the automobile.

After the restoration of the various parts of the apparatus to the position shown in Fig. 1, upon completion of the steps just outlined, and after the heat in the bimetallic switch 68 has dissipated, that switch 68 also returns to the position shown in Fig. 1 and the entire electrical apparatus is restored. If it should once again rain before the driver returns to the vehicle, the entire program described above will be reinstituted to again close the windows and to open the windows when the rain has stopped.

Because it requires a considerable length of time to dry out a wet convertible top and because folding away a wet top induces cracking and molding, the mechanism is not intended to lower the top automatically when it opens the windows. The top remains up, once it has been raised, and when the operator desires it to be lowered he may do so by operating the standard top control switch 49 to close its pair of "down" contacts, connecting the source of power 11 through the lead 25 and switch 49 to the motor 50 and to a down solenoid valve 77.

Each of the conventional manual switches 44 for the windows has a "down" contact connected to its corresponding valve solenoid to permit manual lowering of the windows independently of the operation of the control means. Similarly, the manual switches 44 can be actuated to energize the pump motor 50 and the solenoid valves 45 to raise the windows when desired.

From the above description of an operating cycle, it is to be appreciated that even if the windows and/or top are closed before a rainfall, moisture striking the conductors 18 and 20 would initiate a cycle that would immediately be "surged" into its second phase, and the windows would be lowered when the conductors 18 and 20 dried. Since this would be undesirable if the car had deliberately been left closed and locked, the door lock switch 71 is located in the circuit between the coil 35 and ground to prevent energization of the coil 35 when the door is locked.

In the event that the door is left locked, but one or more of the windows is left open, the closing phase of the cycle will take place upon a rainfall in order to protect the interior but the re-opening will not take place.

A momentary push button 78 is connected between ground and the coil 19. It is thus possible for an operator to simultaneously close all the windows and the top by merely actuating the button 78 regardless of whether or not the ignition switch is on or off. When an automobile battery is low, for example, or when the operator has been driving with the top down, he may wish to actuate the mechanisms and current can be provided directly from the generator while the motor is running. Additionally, the single push button 78 allows an operator to park the car, open the door lock switch 71 by locking the door and by a momentary closing of the button 78, actuate the mechanisms to close all the windows and raise the top to locked, or permanently closed position.

It is to be appreciated that if the person using the apparatus wishes it, one or more of the contacts 42 or 72 can be removed and the corresponding window or the top thus removed from the system.

The mechanism and circuit illustrated in Fig. 4 corresponds to the mechanism and circuit of Fig. 1 in all respects except for those changes necessitated by the fact that the circuit of Fig. 4 is designed for operation with an all-electric window and/or top system. In the apparatus of Fig. 4 the window and top operating mechanisms are driven by reversible electric motors both during the up and down movements of the mechanisms. The apparatus of Fig. 4 thus provides for an electrical surge which occurs upon the reaching of the limit of the movement of the windows and top in either direction, i. e., either when they are fully closed or when they are fully opened. With respect to its operation when the windows and top are fully closed the apparatus illustrated in Fig. 4 is substantially identical with that of Fig. 1 and with respect to its operation when the windows are fully opened, the apparatus of Fig. 4 includes a second mechanism for sensing the surge of power and responding thereto to restore the system to its original condition. In the description of the apparatus of Fig. 4 which follows, therefore, like part numbers will be employed in describing those parts already described with reference to Fig. 1 and new part numbers will be assigned to those parts substituted for or added to corresponding parts in the hydraulic control system of Fig. 1.

The apparatus of Fig. 4 has an ignition switch 10a controlling the ignition system 12a and placed in series with a coil 14a between a source of current 11a and ground indicated at 13a. A plunger 15a of the coil 14a controls a normally closed switch 16a in a line 17a connecting a sensing conductor 18a to a relay coil 19a. A second sensing conductor 20a is wound spirally with the conductor 18a and connected to ground by a lead 21a, the conductors 18a and 20a being wrapped on the exterior of a sensing mechanism body 22a.

The relay coil 19a is also connected through a lead 25a to the source of current 11a. The coil 19a controls a pair of normally open contacts 26a and 27a, the latter of which is connected by a lead 28a to a contact 29a and the contact 29a by a lead 30a to the coil 19a. This is a holding circuit for the coil 19a. The contacts 26a are connected by a lead 31a to a pair of contacts 32a and from the contacts 32a by a lead 33a to a coil 34a which, with a similar opposed coil 35a constitutes an actuating mechanism for a switch 36a. The switch 36a has a single armature 37a extending through both of the coils 34a and 35a and to which the ring contact 24a is fixed. Annular contact plates 40a and 41a mount a plurality of spring contacts 42a and 72a respectively, which are located on opposite sides of the ring contact 24a and closed thereby when the coils 34a or 35a are energized. Two coil springs 39a surround the armature 37a acting between the ring contact 24a and a pair of collars 38a to center the ring contact 24a when neither of the coils 34a or 35a is energized.

Each of the contacts 42a is connected by one of a plurality of parallel leads 43a to the "up" side of one of a plurality of reversible electric motors 45a, each of which actuates the mechanism for raising or lowering one of the windows and to the "up" side of a reversible electric motor 46a for the top. Each of a similar plurality of parallel leads 49a connects one of the "down" contacts of the motors 45a for the windows to one of the contacts 72a. When desired, another lead 49a may be connected from an additional contact 72a to the "down" side of the top operating motor 46a to lower the top when the windows are lowered.

The lead 25a connects all of the switches 44a in parallel to the source of current 11a for independent manual operation by the switches 44a of the individual motors 45a and 46a.

A switch 53a which functionally is identical with the switch 53 of Fig. 1 has a number of similar parts and a number of substantially different parts. The similar parts include the contacts 29a and 32a already mentioned, which are closed by a pressure disk 61a that is mounted on an armature plunger 59a extending through the center of a coil 60a at its left end, a pair of oppositely actuated contacts 63a and a spring detent 58a.

The armature 59a of Fig. 4, however, also extends through the center of a second coil 79 which takes the place of the bellows 52 of the mechanism of Fig. 1. The armature 59a has a pair of annular grooves 80 which are alternately engageable by the detent 58a. A set screw 81 is provided for controlling the degree of tension with which the detent 58a engages in the grooves 80. In addition, the pressure disk 61a also actuates two sets of similar, opposed contacts 82 and 83 mounted on opposite sides of the pressure disk 61a and connected on one side by leads 84 and 85 to the coils 79 and 60a respectively, and on the other side by leads 86 and 87, respectively, and a common lead 88 to the ring contact 24a. The other sides of the coils 60a and 79 are connected by a split lead 89 to the power lead 25a and thus to the contacts 26a and the relay coil 19a.

As in the case of the mechanism of Fig. 1, the contacts 63a are connected by leads 70a to the coil 35a and 66a to a pair of normally closed contacts 64a actuated by the relay coil 19a.

Operation of the device of Fig. 4 is identical with operation of the device of Fig. 1 when the automobile is parked with the ignition switch 10a locked. When raindrops strike the conductors 18a and 20a the relay coil 19a is energized to establish the holding circuit described above and to close the contacts 26a and energize the coil 34a. This pulls the armature 37a to right closing the contacts 42 and energizing the up side of the electric motors 45a and 46a.

At the same time it will be observed in Fig. 4 that the coil 60a of the switch 53a is placed in series through the leads 89 and 25a through the coil 60a, the lead 85 and the contacts 83 to the leads 87 and 88 to the ring contact 24a. During operation of the electric motors 45a and 46a for moving the windows and top upwardly to closed position, the current flowing through the circuit just described also flows through the coil 60a. Since the flux in the coil 60a is a product of its ampere-turns, when the motors 45a and 46a are running normally, the flux produced is insufficient to move the armature 59a against the pressure of the detent 58a. When the windows and top reach their closed positions however, the motors 45a and 46a are stalled and amperage in the circuit increases. Flux in the coil 60a increases proportionately and, depending upon the adjustment of the screw 81, it becomes sufficient to pull the armature 59a out of engagement with the detent 58a snapping the armature 59a to the left and breaking the contact 29a, 32a and 83. This immediately de-energizes the coils 34a and 60a so that the springs 39a return the ring contact 24a to neutral and current no longer flows through the coil 60a. At the same time the pressure disk 61a closes the contacts 63a and 82. This place the coil 79 in series between the power lead 25a, the lead 89, the lead 84, the contacts 82, the leads 86 and 88 and the ring contact 24a. The contacts 63a close the circuit through the leads 70a and 66a between the contacts 64a and the coil 35a.

As long as moisture remains on the conductors 18a and 20a, the coil 19a remains energized holding the contacts 26a and 27a closed and holding the contacts 64a open. However, the opening of the contacts 29a which occurred when the surge of power caused the movement of the armature 59a to the left, has broken the holding circuit for the coil 19a and, therefore, when moisture on the conductors 18a and 20a is evaporated the coil 19a is de-energized.

The evaporation of the remaining moisture by the sun signals the cessation of the rainfall and the desirability of re-opening the automobile windows. De-energization of the coil 19a resulting therefrom allows the contacts 64a to close and the coil 35a is energized. This pulls the armature 37a to the left closing the ring contact 24a and the contacts 72a and, establishing a circuit through the coil 79 and lead 88 as described to the leads 49a, and the down sides of the motors 45a. During the running of the motors 45a to move the windows down, current flows through the coil 79 with an amperage too low to produce an actuating flux. When the windows reach their open positions, however, the motors 45a again stall, increasing the amperage and the flux in the coil 79 to a point where the armature 59a is snapped to the right. This breaks the circuit through the contacts 64a to the coil 35a and the springs 39a return the ring contact 24a to neutral. This also breaks the circuit through the coils 79 and the system is restored to the position shown in Fig. 4 awaiting further rainfall in order to initiate a new program like the one just described.

In summary, the apparatuses of Figs. 1 and 4, are identical in operation. Rainfall striking the sensing mechanism actuates a relay which closes circuits to energize switching means for the actuation of power means to close the windows and top. When the windows and top reach closed position the surge of force (either hydraulic force or electro-motive force) actuates an over-center switching mechanism which re-arranges the circuits so that upon evaporation of the moisture from the rainfall, the second half of the cycle is immediately initiated to energize the power means to lower the windows. When the windows have been opened, the mechanism is actuated to operate the over-center device in the opposite direction, de-energizing the operating mechanisms for the windows and restoring the apparatus to its original condition wherein it will respond to a second rainfall.

Having described the invention, I claim:

1. A control apparatus for power driven window and top raising mechanisms having independent individual electrical switches for each mechanism for manual control of closing and opening of said window and top, said control apparatus comprising, a main switch and circuits controlled thereby in one position for energizing all of said mechanisms simultaneously for closing said top and windows and in a second position for opening at least said window mechanisms, two-position means for establishing switch actuation circuits, a relay for alternately establishing a circuit through said two-position means for each position of said switch, rainfall responsive means for actuating said relay to establish said circuit for the "close" position of said switch, power surge means responsive to the arrival of said top and window mechanisms at the limit of their travel for shifting said two-position means to de-activate said mechanisms and pre-set circuits for the "open" position of said switch and means actuated by said relay for establishing the last mentioned circuits upon opening of said rainfall responsive circuit closer.

2. Apparatus according to claim 1 in which the power surge means is in the power system only during closing operation of said mechanisms and only that power surge occurring at full limit of travel of the tops and windows is employed thereby to shift said two-position means.

3. In apparatus according to claim 1 that is associated with window and top mechanisms that are operated by reversible electric motors, a power surge means having two surge responsive elements that are alternately in circuit with said motors whereby said means are actuated alternately when said motors complete a closing movement and an opening movement for changing connections to said switch and thus to said motors.

4. In apparatus according to claim 1 that is associated with window mechanisms that are operated by hydraulically actuated cylinders during closing movement and by return springs during opening movement, a hydraulic surge responsive element in said two-position means that is in the hydraulic system of said cylinders for shifting said two-position means to its second position upon completion of an opening movement, a second element in said two-position means for shifting said two-position means back to its first position, and a time delay device that is interposed in the circuit to said second element for delaying its operation during the opening movement of said mechanisms by said springs.

References Cited in the file of this patent

UNITED STATES PATENTS

| | | |
|---|---|---|
| 1,584,356 | Chandler | May 11, 1926 |
| 2,611,888 | Richards | Sept. 23, 1952 |
| 2,617,972 | Nutter | Nov. 11, 1952 |
| 2,640,958 | Davis | June 2, 1953 |
| 2,672,582 | Hahn | Mar. 16, 1954 |
| 2,731,588 | McLeod | Jan. 17, 1956 |
| 2,754,460 | Goldman | July 10, 1956 |